(12) United States Patent
Hargreaves et al.

(10) Patent No.: US 8,711,120 B2
(45) Date of Patent: Apr. 29, 2014

(54) SINGLE INTEGRATED CIRCUIT CONFIGURED TO OPERATE BOTH A CAPACITIVE PROXIMITY SENSOR DEVICE AND A RESISTIVE POINTING STICK

(75) Inventors: Kirk Hargreaves, Sunnyvale, CA (US); Dmitriy Kiryashov, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 93 days.

(21) Appl. No.: 13/550,520

(22) Filed: Jul. 16, 2012

(65) Prior Publication Data
US 2014/0015746 A1  Jan. 16, 2014

(51) Int. Cl.
*G06F 3/041* (2006.01)
(52) U.S. Cl.
USPC .................. 345/173; 345/161; 178/18.08
(58) Field of Classification Search
USPC .................. 345/156, 161, 173–181, 157
See application file for complete search history.

(56) References Cited

U.S. PATENT DOCUMENTS

| | | | |
|---|---|---|---|
| 5,874,938 A | 2/1999 | Marten | |
| 5,982,355 A * | 11/1999 | Jaeger et al. | 345/161 |
| 6,175,359 B1 | 1/2001 | Marten | |
| 6,243,077 B1 * | 6/2001 | Manara et al. | 345/157 |
| 6,429,850 B2 | 8/2002 | Marten | |
| 6,486,871 B1 | 11/2002 | Marten | |
| 6,492,979 B1 * | 12/2002 | Kent et al. | 345/173 |
| 6,788,291 B2 | 9/2004 | Burry | |
| 7,391,410 B2 * | 6/2008 | Lutnaes | 345/161 |
| 7,692,631 B2 | 4/2010 | Inokuchi et al. | |
| 8,017,884 B2 * | 9/2011 | Huang et al. | 200/600 |
| 8,179,376 B2 * | 5/2012 | Griffin | 345/173 |
| 8,259,076 B2 * | 9/2012 | Trent et al. | 345/173 |
| 2010/0078231 A1 * | 4/2010 | Yeh et al. | 178/18.05 |

OTHER PUBLICATIONS

Johnston, Jeremy "A Collection of Bridge Transducer Digitizer Circuits", *Crystal Semiconductor Corporation*, (Jan. 1995),28 Pages.
O'Grady, Albert "Transducer/Sensor Excitation and Measurement Techniques", Analog Dialogue 34-5, (2000),6 Pages.

\* cited by examiner

*Primary Examiner* — Duc Dinh

(57) ABSTRACT

A single integrated circuit for operating both a capacitive proximity sensor device and a resistive pointing stick comprises sensor circuitry to drive a first varying voltage signal onto a transmitter electrode of the capacitive proximity sensor device. The sensor circuitry is also configured to drive a second varying voltage signal onto a voltage divider of the pointing stick and a third varying voltage signal onto the voltage divider of the pointing stick. The sensor circuitry is configured to receive a first resulting signal from a receiver electrode of the proximity sensor device and receive a second resulting signal from the pointing stick. The single integrated circuit includes determining circuitry configured to determine positional information for input received in a sensing region of the proximity sensor device based on the first resulting signal; and to determine force information received as input to the pointing stick based on the second resulting signal.

22 Claims, 13 Drawing Sheets

900

DRIVING A FIRST VARYING VOLTAGE SIGNAL ONTO A TRANSMITTER ELECTRODE OF A CAPACITIVE PROXIMITY SENSOR DEVICE, THE FIRST VARYING VOLTAGE SIGNAL DRIVEN WITH SENSOR CIRCUITRY OF A SINGLE INTEGRATED CIRCUIT.
910

↓

DRIVING A SECOND VARYING VOLTAGE SIGNAL ONTO A VOLTAGE DIVIDER OF THE RESISTIVE POINTING STICK, WHEREIN THE SECOND VARYING VOLTAGE SIGNAL COMPRISES SUBSTANTIALLY THE SAME WAVEFORM AS THE FIRST VARYING VOLTAGE SIGNAL, AND WHEREIN THE SECOND VARYING VOLTAGE SIGNAL IS ALSO DRIVEN WITH THE SENSOR CIRCUITRY.
920

↓

DRIVE A THIRD VARYING VOLTAGE SIGNAL ONTO THE VOLTAGE DIVIDER OF THE RESISTIVE POINTING STICK, WHEREIN THE THIRD VARYING VOLTAGE SIGNAL IS ALSO DRIVEN WITH THE SENSOR CIRCUITRY AND IS DRIVEN ONTO AN OPPOSITE END OF THE POINTING STICK FROM THE SECOND VARYING VOLTAGE SIGNAL.
930

↓

RECEIVE A FIRST RESULTING SIGNAL FROM A RECEIVER ELECTRODE OF THE CAPACITIVE PROXIMITY SENSOR DEVICE, THE FIRST RESULTING SIGNAL COMPRISING EFFECTS OF THE FIRST VARYING VOLTAGE SIGNAL, THE FIRST RESULTING SIGNAL RECEIVED WITH THE SENSOR CIRCUITRY.
940

↓

RECEIVE A SECOND RESULTING SIGNAL FROM THE RESISTIVE POINTING STICK, THE SECOND RESULTING SIGNAL COMPRISING EFFECTS OF THE SECOND VARYING VOLTAGE SIGNAL, THE SECOND RESULTING SIGNAL RECEIVED WITH THE SENSOR CIRCUITRY.
950

SINGLE INTEGRATED CIRCUIT CONFIGURED TO OPERATE BOTH A CAPACITIVE PROXIMITY SENSOR DEVICE AND A RESISTIVE POINTING STICK

BACKGROUND

Input devices including proximity sensor devices (also commonly called touchpads or touch sensor devices) and pointing sticks are widely used in a variety of electronic systems.

A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display of the electronic device.

A pointing stick is typically implemented as a bridge circuit arrangement of resistors or one or more half bridge circuit arrangements of resistors which change in value in response to forces applied to the pointing stick. Pointing sticks are also integrated in many small computing systems, some of which also include a proximity sensor device.

SUMMARY

A single integrated circuit configured to operate both a capacitive proximity sensor device and a resistive pointing stick comprises sensor circuitry to drive a first varying voltage signal onto a transmitter electrode of the capacitive proximity sensor device. The sensor circuitry is also configured to drive a second varying voltage signal onto a voltage divider of the pointing stick and a third varying voltage signal onto the voltage divider of the pointing stick. The sensor circuitry is configured to receive a first resulting signal from a receiver electrode of the proximity sensor device and receive a second resulting signal from the pointing stick. The single integrated circuit includes determining circuitry configured to determine positional information for input received in a sensing region of the proximity sensor device based on the first resulting signal; and to determine force information received as input to the pointing stick based on the second resulting signal.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements, and:

FIGS. 9A and 9B illustrate a flow diagram of a method of operating both a capacitive proximity sensor device and a resistive pointing stick with a single integrated circuit, according to various embodiments.

DESCRIPTION OF EMBODIMENTS

The following Description of Embodiments is merely provided by way of example and not of limitation. Furthermore, there is no intention to be bound by any expressed or implied theory presented in the preceding technical field, background, brief summary or the following detailed description.

Various embodiments provide input devices, circuits, and methods that facilitate improved usability.

Figure 1:
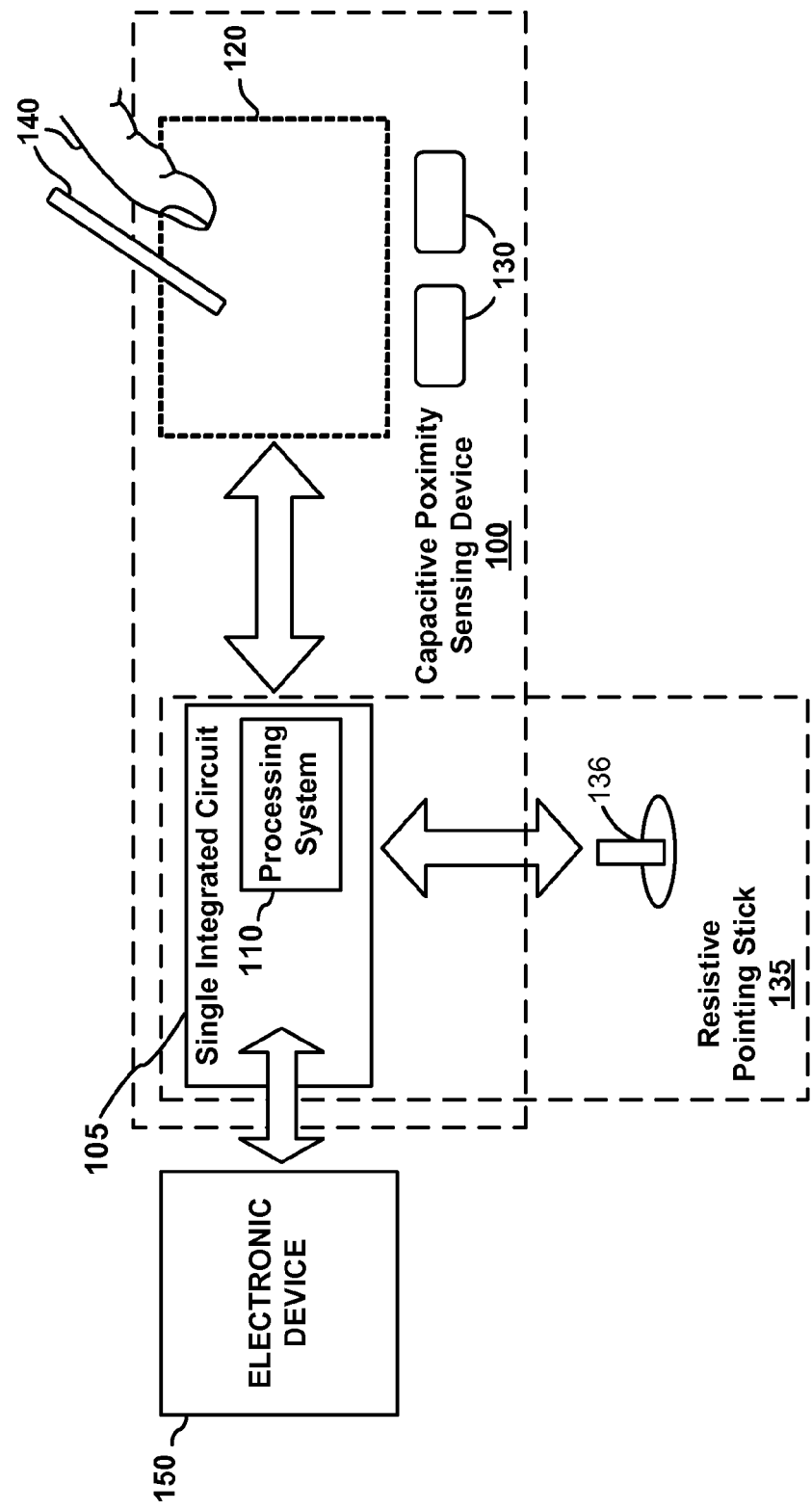
FIG. 1 is a block diagram of multiple example input devices coupled with a single integrated circuit, in accordance with embodiments.

Turning now to the figures, FIG. 1 is a block diagram of multiple example input devices 100, 135 coupled with a single integrated circuit, in accordance with embodiments. Input device 100 represents a capacitive proximity sensing device, while input device 135 represents a resistive pointing stick that utilizes a resistive pointing stick circuit 136 for receiving user input. Both share a common processing system 110 that is disposed on a single integrated circuit (rather than using multiple processing systems and multiple integrated circuits as is conventional). That is, processing system 110 may be used for sensing input from both resistive pointing stick circuit 136 and from sensing region 120 of a capacitive input device 100. Both input device 100 and input device 135 may be configured to provide input to an electronic device 150. As used in this document, the term "electronic device" (or "electronic system") broadly refers to any device/system capable of electronically processing information. Some non-limiting examples of electronic devices/systems include personal computers of all sizes and shapes, such as desktop computers, laptop computers, netbook computers, tablets, web browsers, e-book readers, and personal digital assistants (PDAs). Additional example electronic devices/systems include composite input devices, such as physical keyboards that include input device 100 and/or 135 and/or separate joysticks or key switches. Further example electronic devices/systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic device/system could be a host or a slave to the input device.

Input devices 100, 135 can be implemented as a physical part of the electronic device/system, or can be physically separate from the electronic device/system. As appropriate, input devices 100, 135 may communicate with parts of the electronic device/system using any one or more of the following: buses, networks, and other wired or wireless interconnections. Examples include, but are not limited to: Inter-Integrated Circuit (I2C), Serial Peripheral Interface (SPI), Personal System 2 (PS/2,), Universal Serial Bus (USB), Bluetooth®, Radio Frequency (RF), and Infrared Data Association (IrDA).

In FIG. 1, input device 100 is shown as a capacitive proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near input device 100 in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in sensing region 120. Input device 100 comprises one or more sensing elements for detecting user input. As a non-limiting example, input device 100 may use capacitive techniques.

Some implementations of input device 100 are configured to provide images that span one, two, three, or higher dimensional spaces. Some implementations are configured to provide projections of input along particular axes or planes.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations of input device 100 utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations of input device 100 utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations of input device 100 utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive. In some embodiments, one or more receiver electrodes may be operated to receive a resulting signal when no transmitter electrodes are transmitting (e.g., the transmitters are disabled). In this manner, the resulting signal represents noise detected in the operating environment of sensing region 120.

In FIG. 1, a processing system 110 is shown as part of input device 100. Processing system 110 may also, at the same time be a part of input device 135. Processing system 110 is configured to operate the hardware of input device 100 to detect input in sensing region 120. Processing system 110 comprises a variety of circuitry components associated with input device 100, that are disposed as a portion of a single integrated circuit 105. For example, a processing system 110 for a mutual capacitance sensor device may comprise transmitter circuitry configured to transmit signals with transmitter sensor electrodes, and/or receiver circuitry configured to receive signals with receiver sensor electrodes. As described herein, the same transmitter and receiver circuitry features of processing system 110 are additionally purposed for use in transmitting signals to and receiving signals from resistive elements of input device 135. In some embodiments, processing system 110 also comprises electronically-readable instructions, such as firmware code, software code, and/or the like. As one example, input devices 100, 135 may be physically integrated in a phone, and processing system 110 may comprise circuits and firmware that are part of a main processor of the phone. In some embodiments, processing system 110 is dedicated to implementing input device 100 or input device 135, even though capable of and configured to implement both. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, processing system 110 responds to user input (or lack of user input) in sensing region 120, of input devices 100, 135 by directly causing one or more actions. Example actions include changing operation modes, as well as GUI actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120 and/or operates the resistive elements of input device 135 to produced electrical signals indicative of input (or lack of input) with respect to resistive pointing stick circuit 136. Processing system 110 may perform any appropriate amount of processing on the electrical signals in producing the information provided to the electronic device/system. For example, processing system 110 may digitize analog electrical signals obtained from the sensor electrodes of a capacitive sensor or from the resistive elements of resistive pointing stick circuit 136. As another example, processing system 110 may perform filtering or other signal conditioning. As yet another example, processing system 110 may subtract or otherwise account for a baseline, such that the information reflects a difference between the electrical signals received from input device 100, 135 and the baseline. As yet further examples, processing system 110 may determine positional information, recognize inputs as commands, recognize handwriting, and the like.

"Positional information" as used herein with respect to input devices 100, 135 broadly encompasses interpretation of absolute position, relative position, velocity, acceleration, and other types of spatial information from inputs received from input device 100 and/or 135. Exemplary "zero-dimensional" positional information includes near/far or contact/no contact information, with respect to input device 100. Exemplary "one-dimensional" positional information includes positions along an axis, with respect to input device 100. Exemplary "two-dimensional" positional information includes motions in a plane, with respect to input device 100. Exemplary "three-dimensional" positional information includes instantaneous or average velocities in space, with respect to input device 100. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components. Similarly, input device 135 may be implemented with or without other input components, such as buttons, sliders, balls, wheels, switches, and the like.

In some embodiments, input device 100 may be a touch screen, and sensing region 120 overlaps at least part of an active area of a display screen. For example, input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other tangible storage technology.

Figure 2:
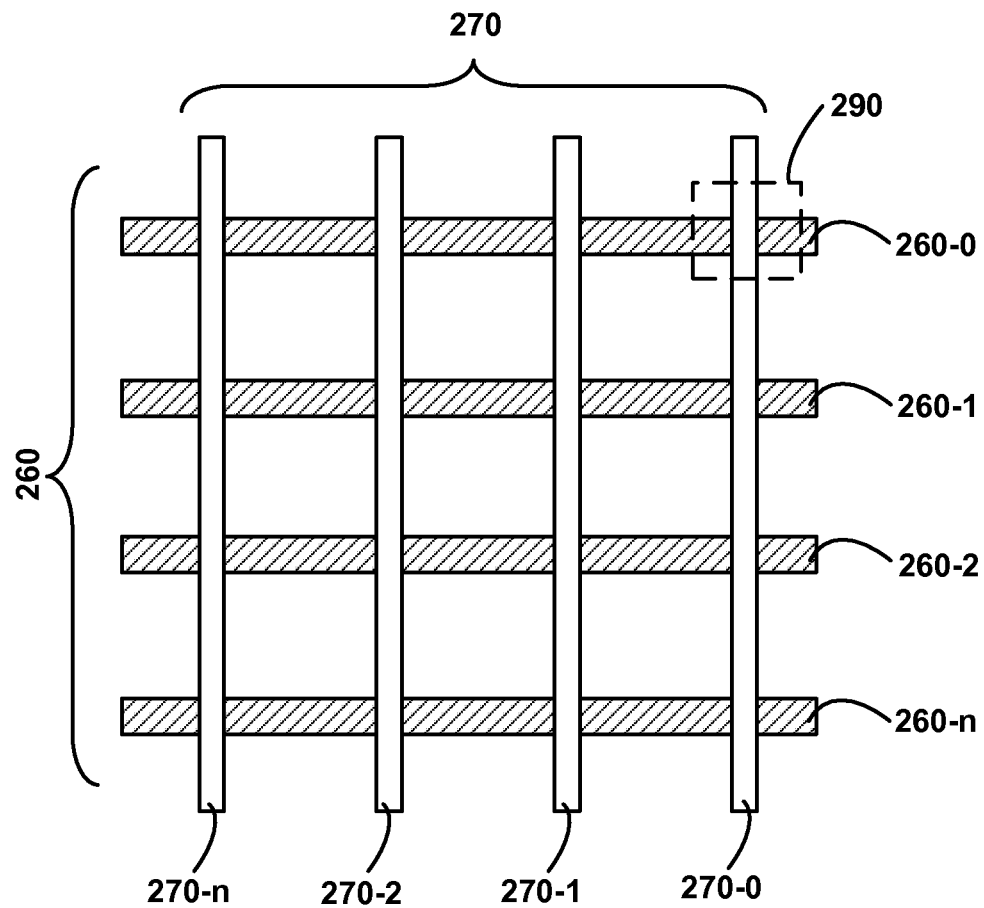
FIG. 2 shows a portion of an example sensor electrode pattern which may be utilized in a sensor to generate all or part of the sensing region of a capacitive proximity sensor input device, such as a touch screen, according to some embodiments.

FIG. 2 shows a portion of an example sensor electrode pattern 200 which may be utilized in a sensor to generate all or part of the sensing region of a input device 100, according to various embodiments. Input device 100 is configured as a capacitive input device when utilized with a capacitive sensor electrode pattern. For purposes of clarity of illustration and description, a non-limiting simple rectangular sensor electrode pattern 200 is illustrated. It is appreciated that numerous other sensor electrode patterns may be employed. The illustrated sensor electrode pattern is made up of a plurality of receiver electrodes 270 (270-0, 270-1, 270-2 . . . 270-n) and a plurality of transmitter electrodes 260 (260-0, 260-1, 260-2 . . . 260-n) which overlay one another, in this example. In the illustrated example, touch sensing pixels are centered at locations where transmitter and receiver electrodes cross. Capacitive pixel 290 illustrates one of the capacitive pixels generated by sensor electrode pattern 200. It is appreciated that in a crossing sensor electrode pattern, such as the illustrated example, some form of insulating material or substrate is typically disposed between transmitter electrodes 260 and receiver electrodes 270. However, in some embodiments, transmitter electrodes 260 and receiver electrodes 270 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

Capacitive pixels, such as capacitive pixel 290, are areas of localized capacitive coupling between transmitter electrodes 260 and receiver electrodes 270. The capacitive coupling between transmitter electrodes 260 and receiver electrodes 270 changes with the proximity and motion of input objects in the sensing region associated with transmitter electrodes 260 and receiver electrodes 270.

In some embodiments, sensor electrode pattern 200 is "scanned" to determine these capacitive couplings. That is, the transmitter electrodes 260 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 270 to be independently determined.

The receiver electrodes 270 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

Figure 3:
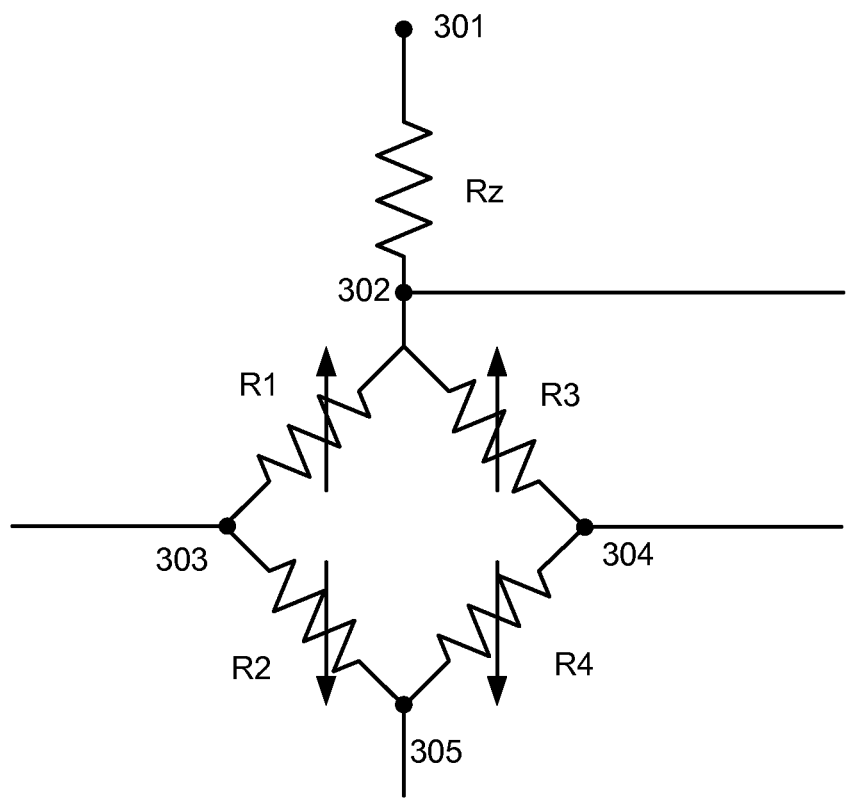
FIG. 3 shows a circuit diagram of a resistive pointing stick, according to some embodiments.

FIG. 3 shows a circuit diagram model of a resistive pointing stick circuit 136, according to some embodiments. As depicted, resistive pointing stick circuit 136 is modeled as a resistive bridge composed of two connected voltage divider networks. Resistors R1 and R2 make up the first voltage divider network, while resistors R3 and R4 make up the second voltage divider network. In some embodiments, resistors R1-R4 may be variable resistors. In the illustrated embodiment, a third voltage divider is also formed by (1) Rz and (2) the totality of R1, R2, R3, and R4. By using sensor circuitry to drive a varying voltage signal at node 302 between R1 and R3 while simultaneously driving another varying voltage signal at node 305 between R2 and R4, resulting signals can be input to sensor circuitry from node 303 between R1 and R2 and node 304 between R3 and R4. Further, if the two varying voltage signals are of opposite polarity, these resulting signals will be zero or near zero in the absence of any force input, as the opposing signals will substantially cancel one another out.

The resulting signals change based on the drive signals and any force applied to the stick which causes a variance in any of the resistors R1, R2, R3, and R4. These two resulting signals are then provided to determining circuitry, which can interpret a single resulting signal as a one-dimensional force input or interpret both resulting signals as a two-dimensional force input (which may be translated to X-axis and Y-axis navigation information). Inclusion of resistor Rz further allows for measuring a third dimension of force input with resistive pointing stick circuit 136. For example, by using sensor circuitry to drive a varying voltage signal at node 301 while simultaneously driving another varying voltage signal at node 305 between R2 and R4, a third resulting signal can be input to sensor circuitry from shared node 302 between resistor Rz and resistors R1 and R3. This third resulting signal from the resistive stick can be conditioned and provided to determining circuitry, which can interpret a one-dimensional force input (which may be translated to Z-axis navigation information).

It should be appreciated that resistive sticks with a circuit layout similar to that shown in FIG. 3 can be acquired as off-the-shelf-components from a number of manufacturers. Additionally, it should be noted that some resistive pointing sticks similarly utilize two resistive half bridges (e.g., R1 and R2 in one circuit and R3 and R4 in another) instead of a single resistive full bridge as illustrated in FIG. 3. Whether full or half resistive bridges are utilized, some manufacturers utilize resistors which have a high resistance in comparison to an impedance of a transmitter that may be utilized to drive a varying voltage signal, while others utilize resistors that have a much lower resistance relative to an impedance of a transmitter that may be utilized to drive a varying voltage signal. Furthermore, although resistors R1-R4 are ideally identical in resistive value, some resistive sticks will have variations. Because of these discrepancies, in part, several techniques will be discussed herein for compensating for and offsetting differences in the values of R1-R4 and also for decreasing the transmitter impedance relative to the resistance of a resistor such as R1. None or one or more of such techniques may be utilized with embodiments described herein.

Figure 4A:
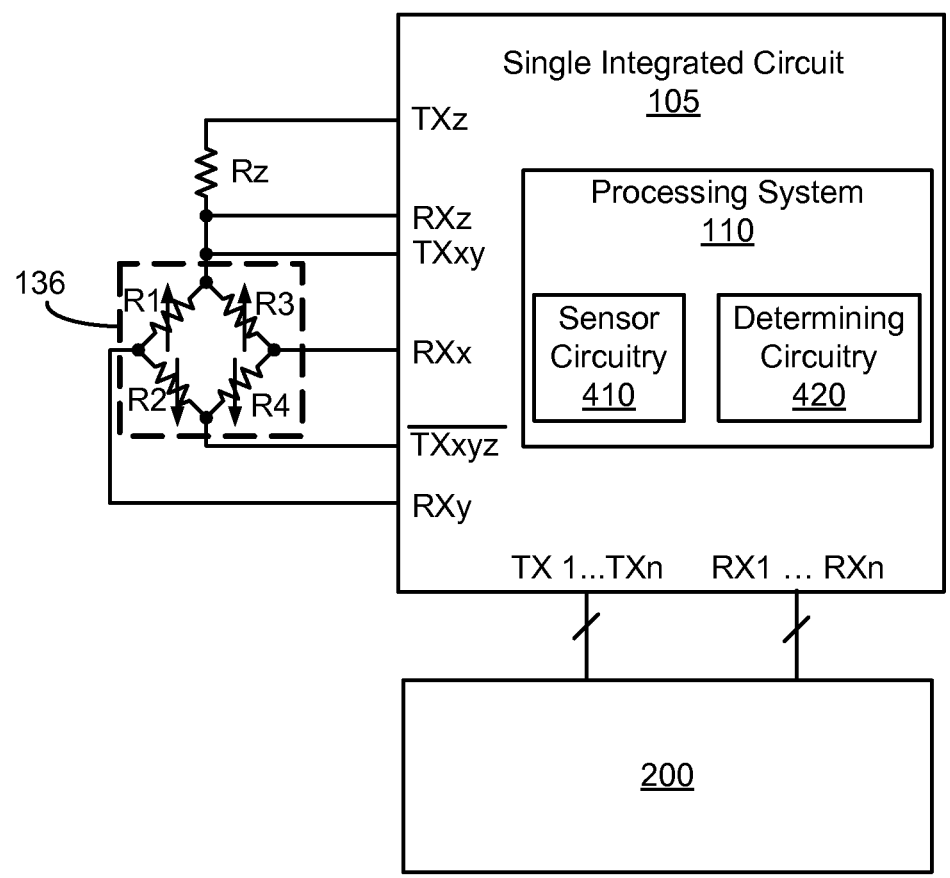
FIG. 4A illustrates a block diagram of a single integrated circuit coupled as part of both a resistive pointing stick circuit and a capacitive proximity sensor, according to some embodiments.

FIG. 4A illustrates a block diagram of a single integrated circuit 105 coupled as part of a resistive pointing stick input device 135 and a capacitive proximity sensor input device 100, according to some embodiments. This is accomplished, for example, by the illustrated coupling of single integrated circuit 105 with components of both resistive pointing stick circuit 136 and with components of sensor electrode pattern 200. As depicted, single integrated circuit 105 includes processing system 110, which is composed of at least sensor circuitry 410 and determining circuitry 420. Sensor circuitry 410 includes a plurality of transmitters and receivers. The transmitters and receivers may be selectively enabled, disabled, and coupled to inputs and outputs of single integrated circuit 105 by operation of processing system 110 (e.g., through hardware or firmware configuration of aspects of processing system 110). Resulting signals received from an input device by a receiver of sensor circuitry 410 is conditioned, such as by integration, filtering, and demodulation, and then provided to determining circuitry 420. Determining circuitry 420 determines positional information based on one or more resulting signals received as inputs from a sensing region of a capacitive proximity sensor device (e.g., input device 100); and/or determines force information based on one or more resulting signals received as input from a resistive pointing stick.

For example, a transmitter such as TX1 of sensor circuitry 410 may drive a first varying voltage signal, such as a square wave, sine wave, triangle wave, or any time varying waveform, onto one or more transmitter electrodes 260 (e.g., 260-0) of sensor electrode pattern 200 and sense a resulting signal on one or more receiver electrodes 270 (e.g., 270-0) of sensor electrode pattern 200. In similar fashion, one or more transmitter electrodes 260 may be driven independently with one or more varying voltage signals and one or more resulting signals may be input independently from one or more receiver electrodes 270. Sensor circuitry 410 also includes transmitters TXz, TXxy, and $\overline{TXxyz}$, which may be additional transmitters to those of TX1 . . . TXn (if resistive pointing stick circuit 136 and sensor electrode pattern 200 are driven simultaneously) or the same transmitters as one or more of TX1 . . . TXn (if resistive pointing stick circuit 136 and sensor electrode pattern 200 are driven in a time-multiplexed fashion relative to one another). Thus, it should be appreciated that TXz, TXxy, $\overline{TXxyz}$, TX1 . . . TXn are physically identical and interchangeable transmitters of sensor circuitry 410, in some embodiments. For example, TXxy may be utilized to drive a capacitive sensing signal onto sensor electrode pattern 200 and TX1 may be utilized to drive a signal onto a resistive pointing stick. In some embodiments, sensor circuitry includes additional transmitters and receivers beyond those depicted.

As is further shown in FIG. 1, sensor circuitry 410 of single integrated circuit 105 senses user inputs via a resistive pointing stick circuit 136. In one embodiment, sensor circuitry 410 alternates between simultaneously measuring X and Y, and measuring Z. Each axis (X, Y, and Z) has its own dedicated receiver (e.g., RXx, RXy, and RXz respectively). In one embodiment, when measuring X and Y, TXz is normally set to a high impedance state or set to drive the same signal at TXxy, TXxy is driven with a varying voltage signal such as a square wave between VDD and VSS, and $\overline{TXxyz}$ is driven with a varying voltage signal of opposite polarity of TXxy, such as an opposite polarity square wave. When driven in this manner, the resulting voltages received at RXx and RXy (both inputs of sensor circuitry 410) are close to one half of the sum of VDD and VSS used in operation of sensor circuitry 410. The resulting voltages are ½ the sum of VDD and VSS because the resistors of resistive pointing stick circuit 136 equally divide the voltage since they are approximately the same value as one another. In the case where VSS is ground, the DC component of the signal is near ½ VDD. In the case where VSS is negative VDD, the DC component of the signal will be near 0 volts. Other waveforms such as sine waves and triangle waves, are two examples, however any time varying waveform may be utilized.

To measure the Z axis of resistive pointing stick circuit 136, a resistor, Rz, having a value equivalent to that seen across the entire pointing stick (including the receiver inputs) is provided. Furthermore, TXxy is set to a high impedance state and TXz and $\overline{TXxyz}$ are driven with opposite polarity varying voltage signals, such as opposite polarity square waves or other opposite polarity waveforms. RXx and RXy are made to have a high impedance during such a Z measurement. For example, RXx and RXy may be disconnected, such as via opening a switch. Alternatively though, if RXx and RXy are not disconnected, receiver amplifiers of sensor circuitry 410 that are associated with RXx and RXy may be disabled.

Figure 4B:
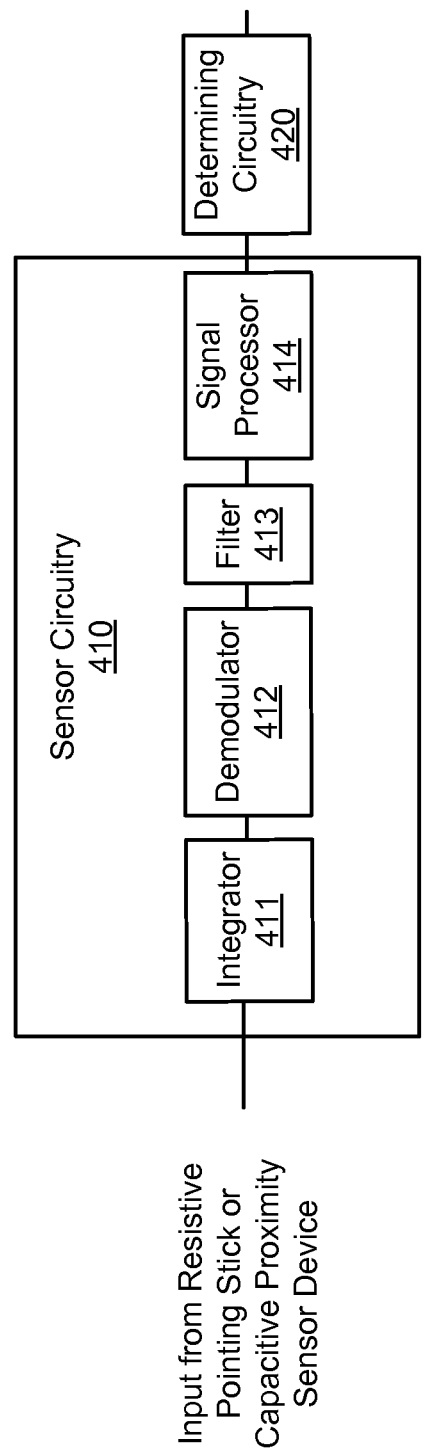
FIG. 4B illustrates an expanded block diagram of the basic components of sensor circuitry illustrated in FIG. 4A.

FIG. 4B illustrates an expanded block diagram of the basic components of sensor circuitry illustrated in FIG. 4A. As illustrated, in one embodiment, a resulting signal from either a resistive pointing stick or a capacitive proximity sensor device is coupled as an input to integrator 411, which in one embodiment is an integrating amplifier. The resulting signal is integrated by integrator 411 and integrated resulting signal, is then demodulated by demodulator 412, filtered by filter 413, converted from an analog signal to a digital signal by signal processor 414. The output of signal processor 414 is provided, in some embodiments, to determining circuitry 420.

Figure 5A:
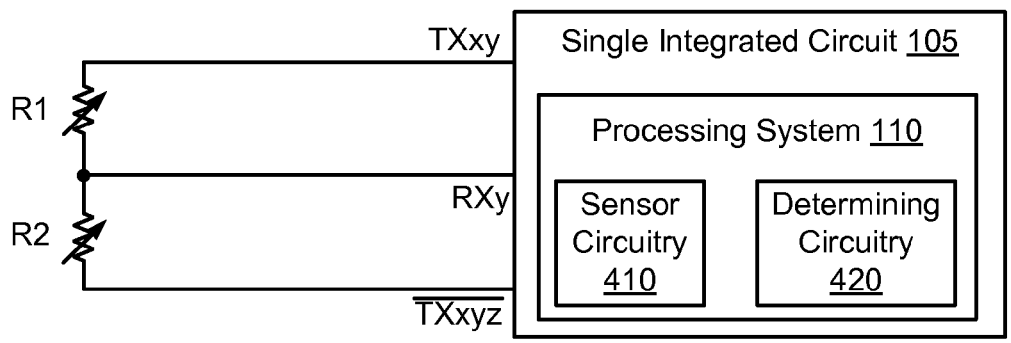
FIGS. 5A-5C illustrate some techniques for coupling a single integrated circuit with a resulting signal from a resistive pointing stick circuit, according to various embodiments.
Figure 5B:
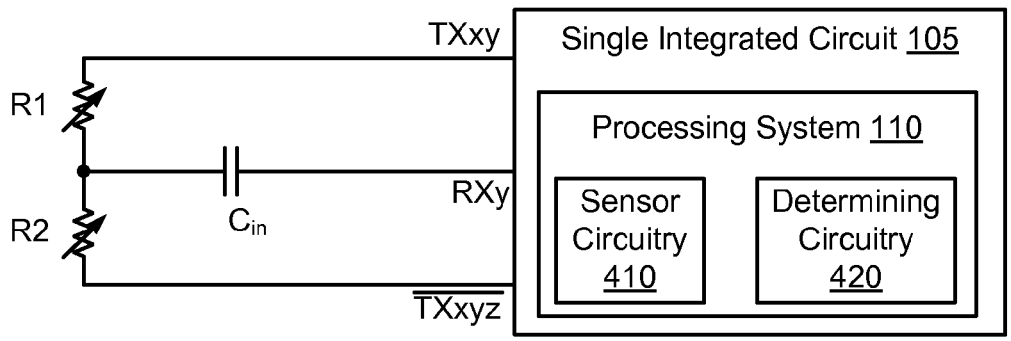
Figure 5C:
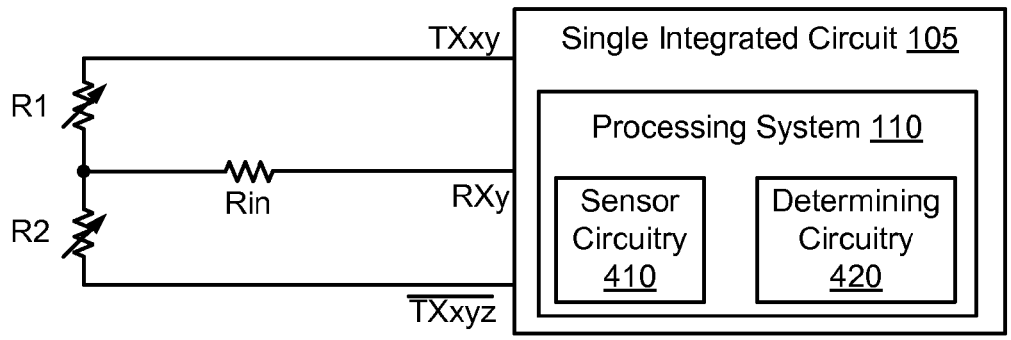

FIGS. 5A-5C illustrate some techniques for coupling a single integrated circuit with a resulting signal from a resistive pointing stick circuit, according to various embodiments. In each of FIGS. 5A-5C, as well as in FIGS. 6, 7, and 8, the half bridge in resistive pointing stick circuit 136 (see FIG. 4A) formed by R1 and R2 and the coupling of a resulting signal to receiver channel RXy is illustrated alone for purposes of simplicity of explanation. However, it should be evident that the techniques described may be utilized for coupling resulting signals from other receiver channels (e.g., RXx and RXz) with sensor circuitry 410 of single integrated circuit 105.

In FIG. 5A, the coupling is direct, with no added resistance or capacitance. Though the coupling is direct, an input such as RXy may have some inherent impedance due to input impedance of an input amplifier.

In FIG. 5B, the coupling is capacitive, through an added series capacitor, Cin, which may be disposed exterior to or interior to single integrated circuit 105.

In FIG. 5C, the coupling is resistive, through an added series resistor, Rin, which may be disposed exterior to or interior to single integrated circuit 105.

Figure 6:
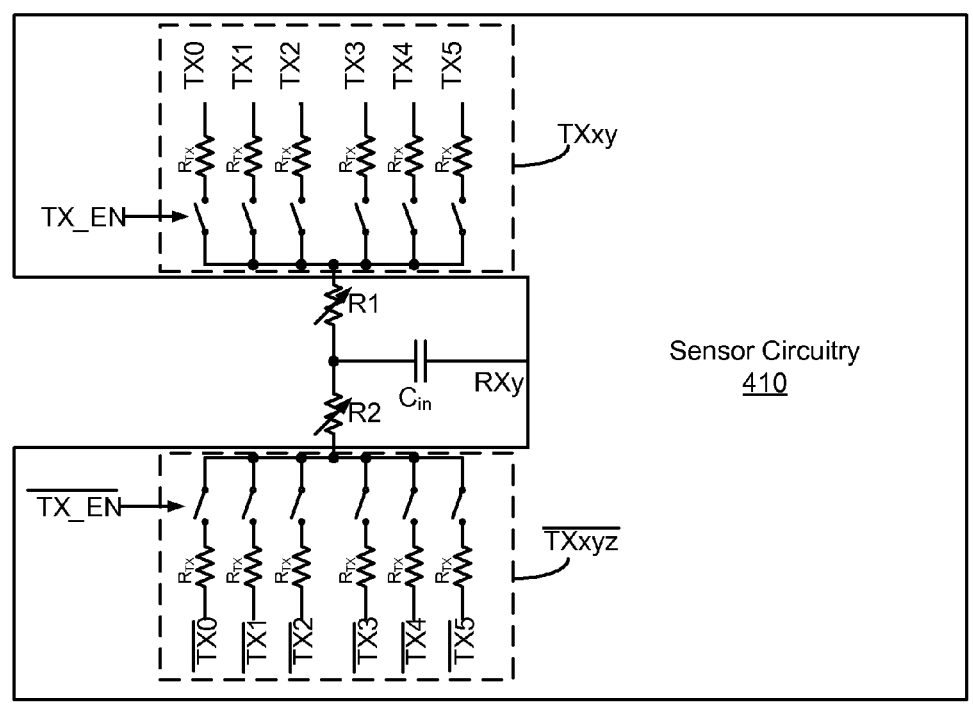
FIG. 6 illustrates sensor circuitry configured to weight transmitters to adjust the transmitter impedance used to drive a resistive pointing stick circuit, according to various embodiments.

FIG. 6 illustrates sensor circuitry configured to weight transmitters to adjust the transmitter impedance used to drive a resistive pointing stick circuit, according to various embodiments. In some embodiments, resistances of resistors R1-R4 used in a resistive pointing stick circuit 136 are high enough relative to transmitter impedances driving opposite ends of the resistive bridge of resistive pointing stick circuit 136 that imbalances in transmitters of sensor circuitry 410 (e.g., transmitters TXxy and $\overline{TXxyz}$) can be considered negligible in relation to the size of the resistances of R1-R4. However, in some instances these mismatches in transmitter impedances are not negligible in comparison to the value of resistors R1-R4. Moreover, in some such instances, there may also be small mismatches in the values of R1-R4, which ideally should all be of equal value in an at rest resistive pointing stick circuit 136.

To reduce or eliminate mismatches in transmitter impedance, and to reduce/eliminate some mismatches resistances of R1-R4, in one embodiment, the impedances of the transmitters can be altered by utilizing two or more transmitters in parallel to operate as TXxy and $\overline{TXxyz}$. FIG. 6 illustrates a circuit in which processing system 110 can select one or more of transmitters TX0 to TX5, through a TX_EN signal, for generating the TXxy varying voltage signal. By paralleling two or more of transmitters TX0 to TX5, their transmitter impedances RTX are also paralleled, and thus reduced. Similarly, processing system 110 can select two or more of transmitters $\overline{TX0}$ to $\overline{TX5}$ for generating the $\overline{TXxyz}$ varying voltage signal. Various approaches may be taken in order to select a combination of transmitters to balance out resistances. In one embodiment, for example, processing system 110 can cycle through a variety of combinations of one or more transmitters while resistive pointing stick circuit 136 is in an at rest position, with the object of eliminating or minimizing resulting signal outputs (e.g., on RXx, RXy, RXz), and thus best balancing out resistances with available constraints. When an effective combination of transmitters is arrived at, it can be used when resistive pointing stick circuit 136 is not at rest.

Figure 7:
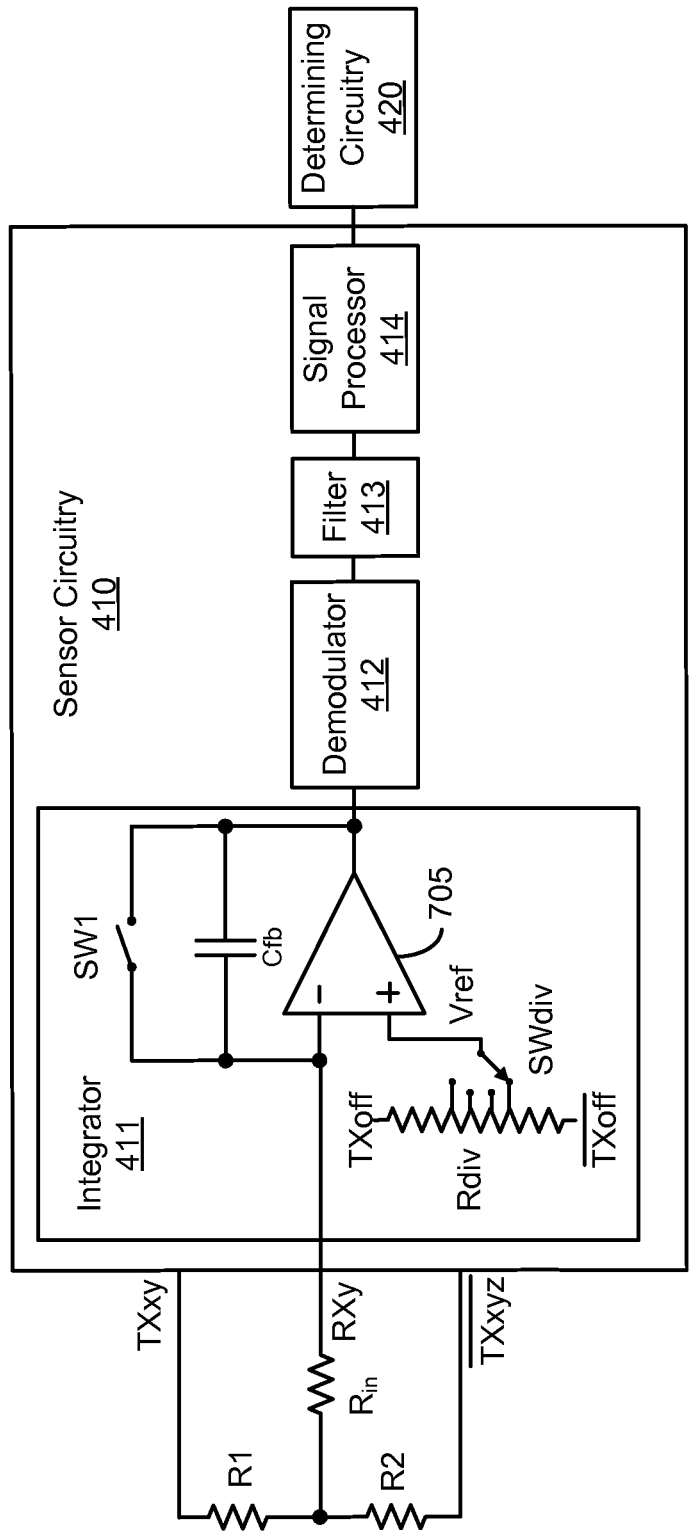
FIG. 7 illustrates sensor circuitry configured to utilize offset voltages compensate for variations in resistances associated with operation of a resistive pointing stick circuit, according to various embodiments.

FIG. 7 illustrates sensor circuitry configured to utilize offset voltages compensate for variations in resistances associated with operation of a resistive pointing stick circuit, according to various embodiments. This offsetting is a modification to the basic circuitry which is illustrated in FIGS. 4A and 4B. For example, as illustrated in FIG. 7, a resulting signal is coupled through Rin to input RXy. As illustrated the expanded diagram of sensor circuitry 410 provided by FIG. 7, in one embodiment, RXy is the inverting input of an integrating amplifier 705. Amplifier 705 is configured with a feedback capacitor, Cfb, disposed between its output and its inverting input, and a reset switch, SW1, disposed in parallel with feedback capacitor Cfb. Reset switch SW1 is controlled by processing system 110, in one embodiment. It is appreciated that in some embodiments, SW1 may be replaced by a resistor or a switched capacitor resistor. The output of amplifier 705 is an integrated resulting signal, which is then demodulated by demodulator 412, filtered by filter 413, converted from an analog signal to a digital signal by signal processor 414. The output of signal processor 414 is provided, in some embodiments, to determining circuitry 420.

In some embodiments, sensor circuitry 410 further includes a synchronously varying reference voltage which can be coupled with the non-inverting input of amplifier 705 to offset voltages due to differences in the resistances of each portion of a half bridge (i.e., differences in R1 and R2), which cause small input signals even in the absence of a user force input via resistive stick input device 135. In one embodiment, a resistor chain Rdiv with a plurality of selectable taps along is driven with transmitter signals TXoff and $\overline{TXoff}$. The selected tap applies a small amplitude time varying voltage Vref with an offset near the mid-power rail. For example, the tap selected by switch SWdiv may be controlled by processing system 110 to select a positive or negative offset to the signal from the resistive stick. In other embodiments, a synchronous variable Vref voltage may be utilized in a similar fashion and varied under control of processing system 110. In such an offset matched configuration, there is no current flow through amplifier 705 and thus no output signal from amplifier 705 in a baseline condition where there is no force input via resistive pointing stick input device 135. Such a signal offset matching increases the gain available to amplifier 705, because the signal offset is eliminated and is therefore not amplified and not consuming a portion of the dynamic rail-to-rail amplification range.

Figure 8:
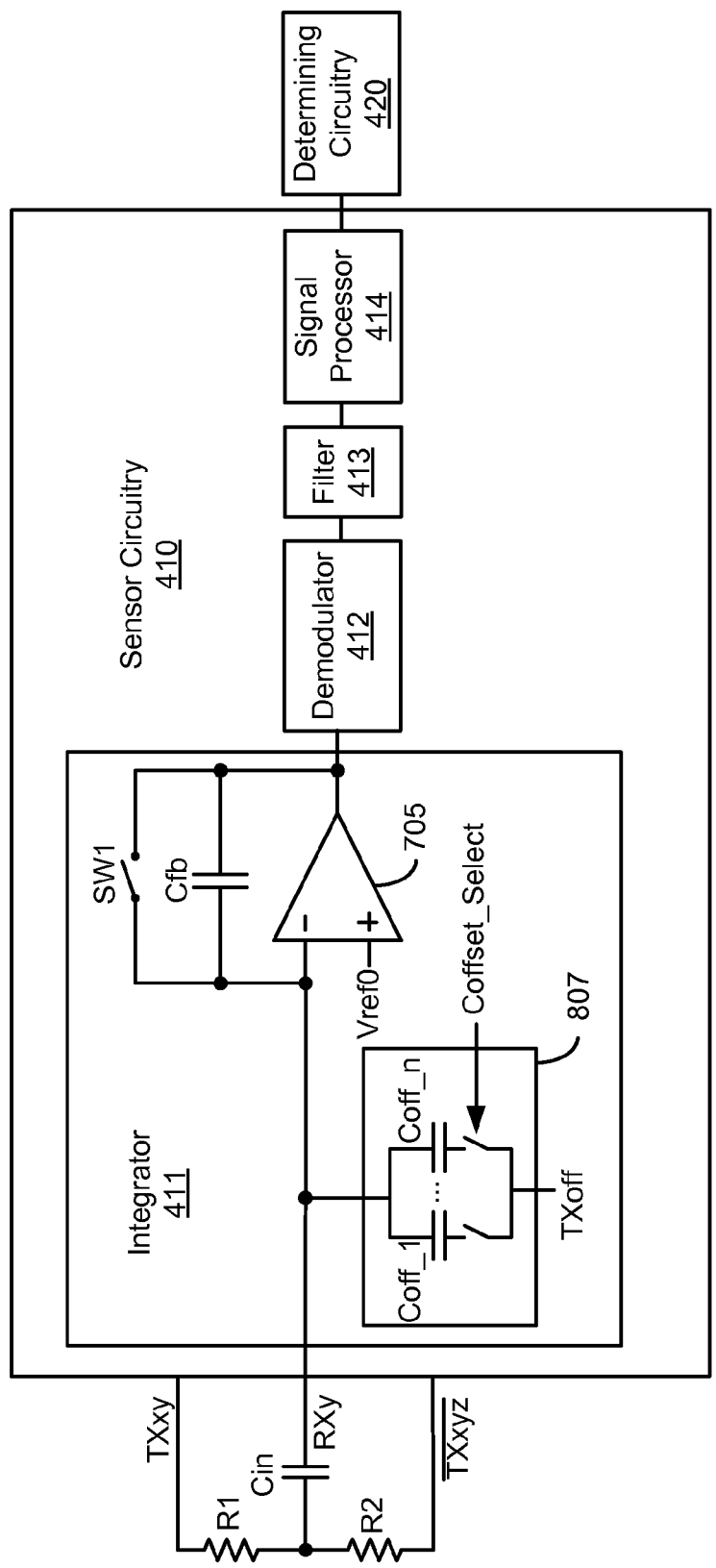
FIG. 8 illustrates sensor circuitry configured to utilize offsetting charges to compensate for variations in resistances associated with operation of a resistive pointing stick circuit, according to various embodiments.

FIG. 8 illustrates sensor circuitry configured to utilize offsetting charges to compensate for variations in resistances associated with operation of a resistive pointing stick circuit, according to various embodiments. FIG. 8 is similar to FIG. 7 except that instead of performing offset matching with voltages coupled with non-inverting input of amplifier 705, offset matching is performed by using a selectable charge 807 to offset a charge input received at the inverting input of amplifier 705. For example, in one embodiment, variable offset charge is supplied by a bank of selectable offset capacitors (Coff_1 through Coff_n). Processing system 110 uses Coffset_Select to select one or more of the offset capacitors to couple with an offset signal, TXoff. Charge from these capacitors then offsets any charge present on RXy in a baseline condition when there is no force input from a user via resistive pointing stick input device 135. This charge offsetting eliminates or minimizes the presence of a baseline charge on RXy. It is appreciated that selectable charge 807 may be supplied by other means in other embodiments, such as by a selectively variable capacitor, a variable resistor, or a selectively variable current source. Such charge offset matching increases the gain available to amplifier 705, because the charge offset is eliminated and is therefore not amplified and not consuming a portion of the dynamic rail-to-rail amplification range.

Example Methods of Operation

Figure 9B:
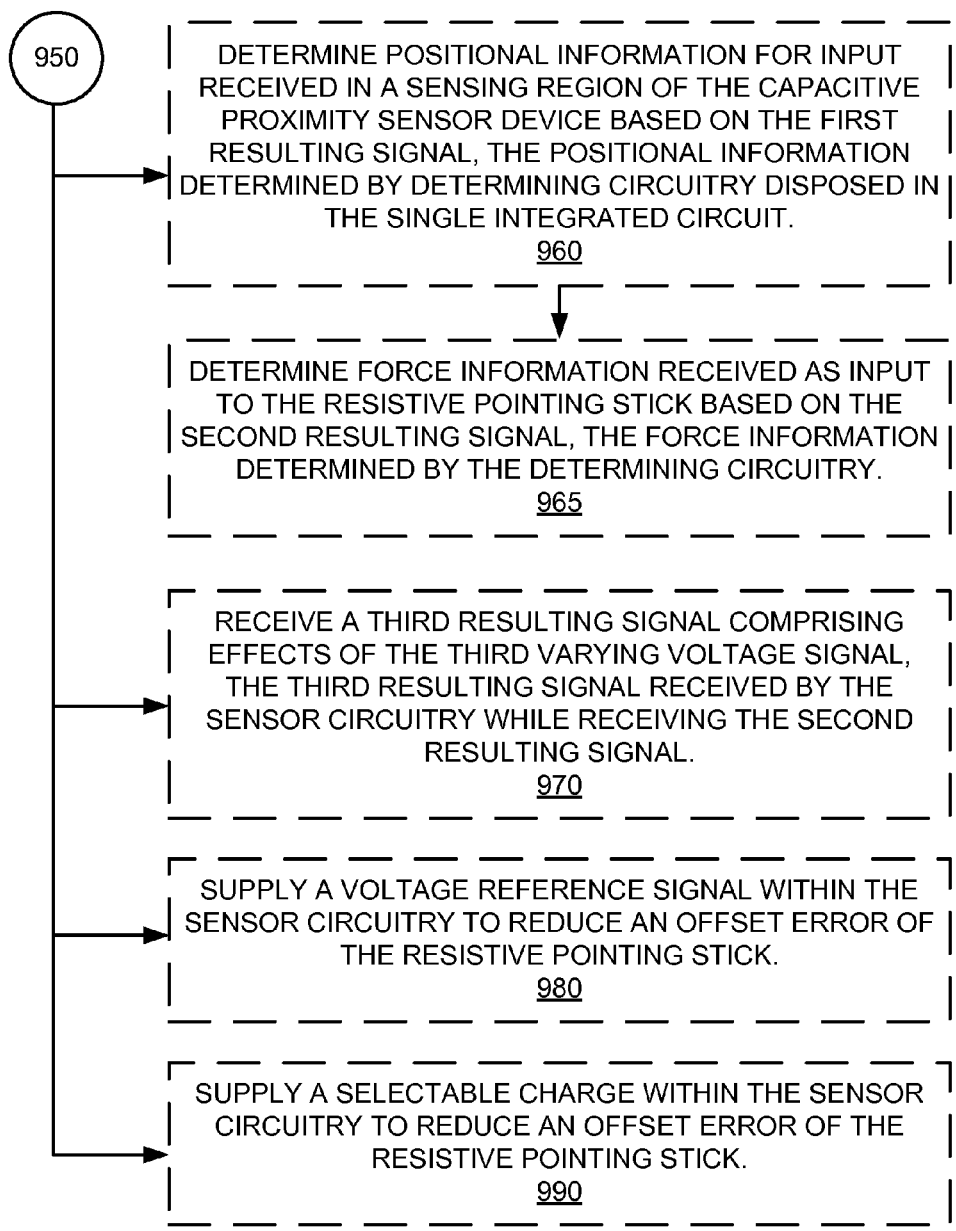

FIGS. 9A and 9B illustrate a flow diagram 900 of a method of operating both a capacitive proximity sensor device and a resistive pointing stick with a single integrated circuit, according to various embodiments. Reference will be made to circuits and components illustrated in FIGS. 1-8 during description of flow diagram 900.

At 910 of flow diagram 900, in one embodiment, a first varying voltage signal is driven onto a transmitter electrode of a capacitive proximity sensor device. The first varying voltage signal driven with sensor circuitry (e.g., sensor circuitry 410) of a single integrated circuit (e.g., single integrated circuit 105). With reference to FIGS. 2 and 4, in one example embodiment, this comprises sensor circuitry 410 driving a first varying voltage with transmitter TX1 onto a sensor electrode, such as transmitter sensor electrode 260-0, in sensor electrode pattern 200 of capacitive proximity sensor input device 100. The first varying voltage signal is a square wave in one embodiment. In other embodiments, the first varying voltage signal may be a repeating wave form other than a square wave, such as a sine wave, triangle wave, or any other time varying waveform.

At 920 of flow diagram 900, in one embodiment, a second varying voltage signal is driven onto a voltage divider of a resistive pointing stick. The voltage divider may be part of or coupled with a half resistive bridge or a full resistive bridge. The second varying voltage signal comprises substantially the same waveform as the first varying voltage signal, and the second varying voltage signal is also driven with the sensor circuitry. With reference to FIG. 4A, in one example embodiment, this may comprise sensor circuitry 410 also driving a second varying voltage with transmitter TXxy onto resistive pointing stick circuit 136 of resistive stick input device 135. In a case where the first varying voltage signal is a square wave the second varying voltage signal may comprise the same or substantially similar square wave.

In some embodiments, the second varying voltage signal is driven in time multiplexed sequence with the first varying voltage signal. That is, the first varying voltage signal is driven, and then after the first varying voltage signal is driven the second varying voltage signal is driven. In such an embodiment, the same transmitter amplifier(s) of sensor circuitry 410 may be used to drive both the first and second varying voltage signals.

In some embodiments, the second varying voltage signal is driven simultaneously in time with the first varying voltage signal.

In some embodiments, the second varying voltage signal is driven with more than one of a plurality of transmitters of sensor circuitry 410 to reduce an offset error of the resistive pointing stick. This is illustrated and described in conjunction with FIG. 6.

At 930 of flow diagram 900, in one embodiment, a third varying voltage signal is driven onto the same voltage divider of the resistive pointing stick. With reference to FIG. 4A, the resistive bridge comprises a voltage divider, such as the voltage divider of R1 and R2 and the voltage divider of R3 and R4. The second varying voltage signal and the third varying voltage signal are driven on different ends of the same voltage divider by the sensor circuitry. With reference to FIG. 4A, in one example embodiment, sensor circuitry 410 drives the third varying voltage with transmitter $\overline{TXxyz}$. As is illustrated in FIG. 4A, TXxy and $\overline{TXxyz}$ are driven onto opposite ends of the voltage dividers of resistive pointing stick circuit 136. The second and third varying voltage signals are driven simultaneously and, in one embodiment, are opposite in phase. Thus, in an embodiment where TXxy drives a square wave, $\overline{TXxyz}$ drives a substantially similar square wave that is 180 degrees out of phase.

In some embodiments, the third varying voltage signal is driven with more than one of a plurality of transmitters of sensor circuitry 410 to reduce an offset error of the resistive pointing stick. This is illustrated and described in conjunction with FIG. 6

At 940 of flow diagram 900, in one embodiment, a first resulting signal is received from a receiver electrode of the capacitive proximity sensor device. The first resulting signal comprises effects of the first varying voltage signal and is received with the sensor circuitry. With reference to FIG. 4A, and the above described example embodiment, this may comprise sensor circuitry 410 receiving an input signal from a sensor electrode, such as receiver electrode 270-0, in sensor electrode pattern 200 of capacitive proximity sensor input device 100.

At 950 of flow diagram 900, in one embodiment, a second resulting signal is received from the resistive pointing stick. The second resulting signal comprises effects of the second varying voltage signal and is received with the sensor circuitry. With reference to FIG. 4A, and the above described example embodiment, this may comprise sensor circuitry 410 receiving an input signal on one of RXy or RXx from resistive pointing stick circuit 136.

At 960, in one embodiment the method as described in 910-950 of flow diagram 900 further comprises, determining positional information for input received in a sensing region of the capacitive proximity sensor device based on the first resulting signal. With reference to FIG. 4A, such positional information is determined, in one embodiment, by determining circuitry 420 disposed in single integrated circuit 105.

At 965, in one embodiment the method as described in 910-960 of flow diagram 900 further comprises, determining force information received as input to the resistive pointing stick. The force information is based on the second resulting signal and is determined by determining circuitry 420.

At 970, in one embodiment the method as described in 910-950 of flow diagram 900 further comprises, receiving a third resulting signal comprising effects of the third varying voltage signal. With reference to FIG. 4A, the third resulting signal is received by sensor circuitry 410 while receiving the second resulting signal. With reference to FIG. 4A, and the above described example embodiment, this may comprise sensor circuitry 410 receiving an input signal on the other of RXy or RXx from resistive pointing stick circuit 136.

At 980, in one embodiment the method as described in 910-950 of flow diagram 900 further comprises, supplying a voltage reference signal within the sensor circuitry to reduce an offset error of the resistive pointing stick. Reference is made to FIG. 7 and the accompanying description of supplying a reference voltage signal such as Vref0 to reduce offset error of resistors R1 and R2.

At 990, in one embodiment the method as described in 910-950 of flow diagram 900 further comprises supplying a selectable charge within the sensor circuitry to reduce an offset error of the resistive pointing stick. Reference is made to FIG. 8 and the accompanying description of supplying a selectable charge 807 to reduce offset error of resistors R1 and R2.

Common-Mode Noise Detection

Figure 10A:
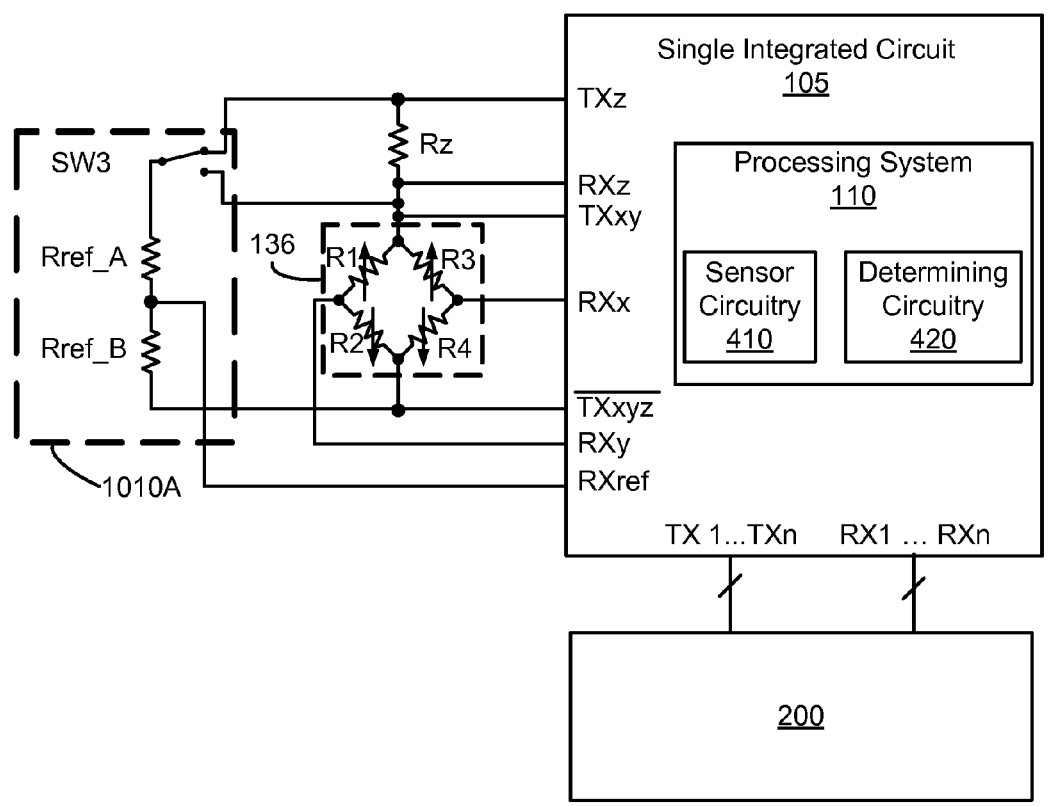
FIGS. 10A and 10B illustrate variations of the block diagram of FIG. 4A, in which an additional resistor divider has been added to detect common mode noise, according to some embodiments.
Figure 10B:
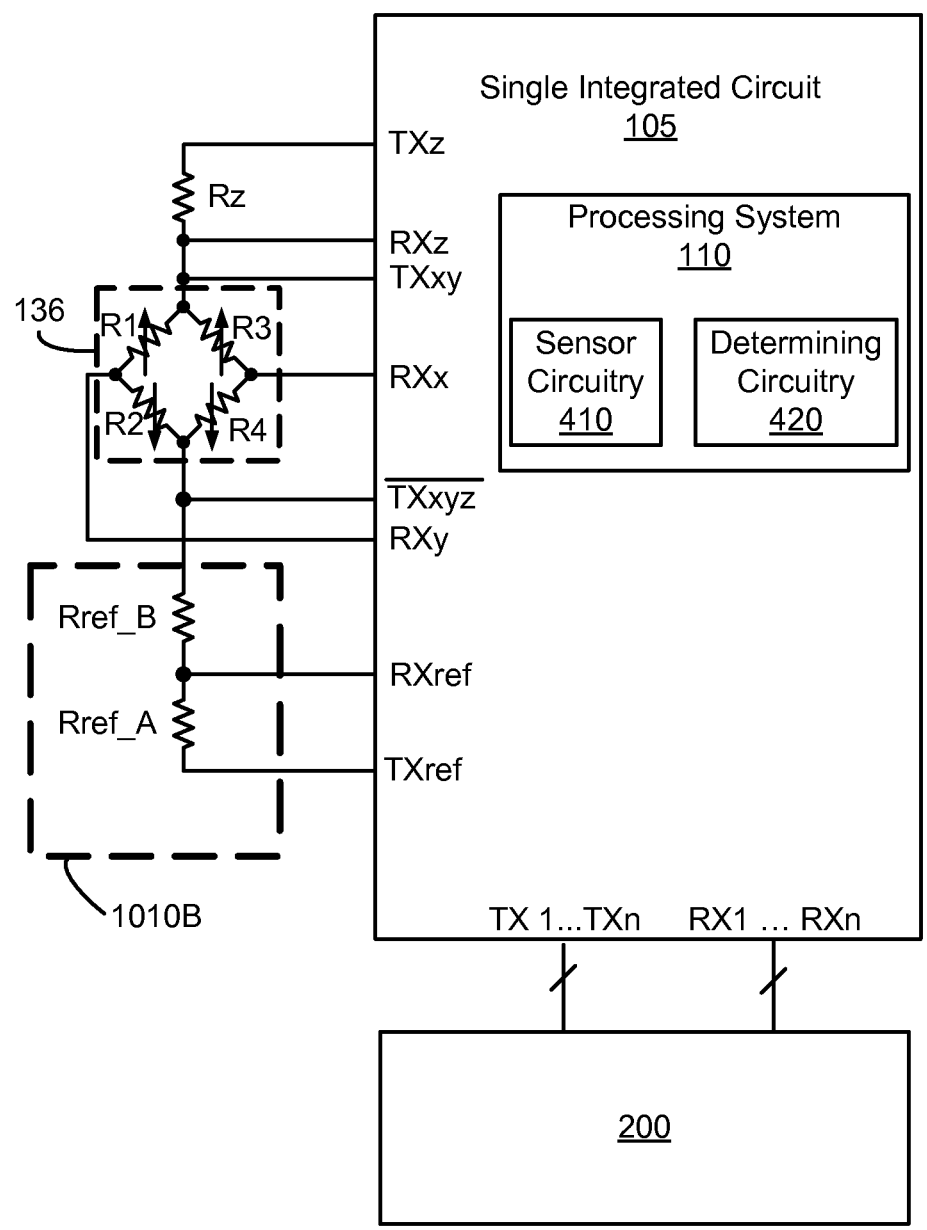

FIGS. 10A and 10B illustrate variations of the block diagram of FIG. 4A, in which an additional resistor divider has been added to detect common mode noise, according to some embodiments.

In FIG. 10A, the common mode noise is detected by circuit 1010A which is unaffected by input activity on resistive pointing stick circuit 136. In one embodiment, circuit 1010A comprises a resistor divider network formed by resistors Rref_A and Rref_B, which are of equal resistance to one another and may also be of substantially similar resistance to any of R1-R4. Processing system 110 can alternate between driving the top of RXref_A with the varying voltage signal of TZx or the varying voltage signal of TXxy by utilizing switch SW3, while the bottom of resistor Rref_B is driven by $\overline{TXxyz}$, when active. A resulting signal is obtained the node between Rref_A and Rref_B, and is input to sensor circuitry 410 at RXref. Processing system 110, in one embodiment, monitors the signal input at RXref for changes as indication of common mode noise or drift. When noted, processing system 110 can subtract out such changes from the data obtained from resistive pointing stick circuit 136 and used for X, Y, and Z position change inputs.

Circuit 1010B in FIG. 10B operates in a similar fashion to circuit 1010A, except that circuit 1010B is combined with resistive pointing stick circuit 136. As illustrated, the top of Rref_B is coupled with the node between R2 and R4. Sensor circuitry 410 drives an additional varying voltage signal with transmitter TXref, which is the central difference in the operation of circuit 1010B as compared to circuit 1010A. The varying voltage signals driven by TXref, TXxy, and TXz are substantially similar or identical to one another. Like circuit 1010A, circuit 1010B is unaffected by input activity on resistive pointing stick circuit 136. A resulting signal is obtained from the node between Rref_A and Rref_B, and is input to sensor circuitry 410 at RXref. Processing system 110, in one embodiment, monitors the signal input at RXref for changes as indication of common mode noise or drift. When noted, processing system 110 can subtract out such changes from the data obtained from resistive pointing stick circuit 136 and used for X, Y, and Z position change inputs.

Although depicted as being external to single integrated circuit 105, it is appreciated that in some embodiments, circuit 1010A and or circuit 1010B may be implemented partially or entirely within single integrated circuit 105. It is further appreciated that procedures for a common mode noise detection, utilizing circuits such as those illustrated in FIGS. 10A and 10B, may be implemented as a part of the method described in flow diagram 900 of FIGS. 9A and 9B.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

What is claimed is:

1. A single integrated circuit configured to operate both a capacitive proximity sensor device and a resistive pointing stick, said single integrated circuit comprising:
   sensor circuitry disposed as a portion of said single integrated circuit and configured to:
      drive a first varying voltage signal onto a transmitter electrode of said capacitive proximity sensor device;
      drive a second varying voltage signal onto a voltage divider of said resistive pointing stick, wherein said second varying voltage signal comprises substantially the same waveform as said first varying voltage signal;
      drive a third varying voltage signal onto said voltage divider of said resistive pointing stick, wherein said second varying voltage signal and said third varying voltage signal are driven on different ends of said voltage divider;
      receive a first resulting signal from a receiver electrode of said capacitive proximity sensor device, said first resulting signal comprising effects of said first varying voltage signal; and
      receive a second resulting signal from said resistive pointing stick, said second resulting signal comprising effects of said second varying voltage signal;
   determining circuitry disposed as a portion of said single integrated circuit and configured to:
      determine positional information for input received in a sensing region of said capacitive proximity sensor device based on said first resulting signal; and
      determine force information received as input to said resistive pointing stick based on said second resulting signal.

2. The single integrated circuit of claim 1, wherein said sensor circuitry is further configured to:
   receive a third resulting signal comprising effects of said third varying voltage signal, said third resulting signal received while receiving said second resulting signal.

3. The single integrated circuit of claim 2, wherein said determining circuitry is further configured to:
   determine said force information received as an input to said resistive pointing stick based on said second resulting signal and said third resulting signal.

4. The single integrated circuit of claim 1, wherein said sensor circuitry is further configured to:
   drive said third varying voltage signal onto said resistive pointing stick wherein said second varying voltage signal and said third varying voltage signal have substantially opposite polarities; and
   receive a third resulting signal comprising effects of said third varying voltage signal.

5. The single integrated circuit of claim 1, wherein said sensor circuitry is further configured to drive said first varying voltage signal and said second varying voltage signal in sequence.

6. The single integrated circuit of claim 1, wherein said sensor circuitry comprises a plurality of transmitters and is configured to simultaneously drive said second varying voltage signal with more than one of said plurality of transmitters to reduce an offset error of said resistive pointing stick.

7. The single integrated circuit of claim 1, wherein said sensor circuitry comprises a voltage reference signal configured to reduce an offset error of said resistive pointing stick.

8. The single integrated circuit of claim 1, wherein said sensor circuitry comprises a selectable capacitance configured to reduce an offset error of said resistive pointing stick.

9. The single integrated circuit of claim 1, wherein said second resulting signal is capacitively coupled from said resistive pointing stick to said sensor circuitry.

10. The single integrated circuit of claim 1, wherein said second resulting signal is resistively coupled from said resistive pointing stick to said sensor circuitry.

11. The single integrated circuit of claim 1, wherein said second resulting signal is directly coupled from said resistive pointing stick to said sensor circuitry.

12. A method of operating both a capacitive proximity sensor device and a resistive pointing stick with a single integrated circuit, said method comprising:
   driving a first varying voltage signal onto a transmitter electrode of said capacitive proximity sensor device, said first varying voltage signal driven with sensor circuitry of said single integrated circuit;
   driving a second varying voltage signal onto a voltage divider of said resistive pointing stick, wherein said second varying voltage signal comprises substantially the same waveform as said first varying voltage signal, and wherein said second varying voltage signal is also driven with said sensor circuitry;
   driving a third varying voltage signal onto said voltage divider of said resistive pointing stick, wherein said second varying voltage signal and said third varying voltage signal are driven on different ends of said voltage divider by said sensor circuitry;
   receiving a first resulting signal from a receiver electrode of said capacitive proximity sensor device, said first resulting signal comprising effects of said first varying voltage signal, said first resulting signal received with said sensor circuitry; and
   receiving a second resulting signal from said resistive pointing stick, said second resulting signal comprising effects of said second varying voltage signal, said second resulting signal received with said sensor circuitry.

13. The method as recited in claim 12, further comprising:
   determining positional information for input received in a sensing region of said capacitive proximity sensor device based on said first resulting signal, said positional information determined by determining circuitry disposed in said single integrated circuit;
   and determining force information received as input to said resistive pointing stick based on said second resulting signal, said force information determined by said determining circuitry.

14. The method as recited in claim 13, further comprising:
   receiving a third resulting signal comprising effects of said third varying voltage signal, said third resulting signal received by said sensor circuitry while receiving said second resulting signal.

15. The method as recited in claim 12, further comprising:
   supplying a voltage reference signal within said sensor circuitry to reduce an offset error of said resistive pointing stick.

16. The method as recited in claim 12, further comprising:
   supplying a selectable charge within said sensor circuitry to reduce an offset error of said resistive pointing stick.

17. The method as recited in claim 12, wherein said driving said second varying voltage signal comprises:
   driving said second varying voltage signal in time multiplexed sequence with said first varying voltage signal.

18. The method as recited in claim 12 wherein said driving said second varying voltage single comprises:
   simultaneously driving said second varying voltage signal with more than one of a plurality of transmitters of said sensor circuitry to reduce an offset error of said resistive pointing stick.

19. The method as recited in claim 12, wherein said driving a third varying voltage signal onto said voltage divider of said resistive pointing stick comprises:
   driving said third varying voltage signal with said sensor circuitry to have a substantially opposite polarity of said second varying voltage signal.

20. An electronic device comprising:
   a capacitive proximity sensor device;
   a resistive pointing stick, and
   a single integrated circuit configured to operate both said capacitive proximity sensor device and said resistive pointing stick, said single integrated circuit comprising:
      sensor circuitry disposed as a portion of said single integrated circuit and configured to:
         drive a first varying voltage signal onto a transmitter electrode of said capacitive proximity sensor device;
         drive a second varying voltage signal onto a voltage divider of said resistive pointing stick, wherein said second varying voltage signal comprises substantially the same waveform as said first varying voltage signal;
         drive a third varying voltage signal onto said voltage divider of said resistive pointing stick, wherein said second varying voltage signal and said third varying voltage signal are driven on different ends of said voltage divider;
         receive a first resulting signal from a receiver electrode of said capacitive proximity sensor device, said first resulting signal comprising effects of said first varying voltage signal; and
         receive a second resulting signal from said resistive pointing stick, said second resulting signal comprising effects of said second varying voltage signal;
      determining circuitry disposed as a portion of said single integrated circuit and configured to:
         determine positional information for input received in a sensing region of said capacitive proximity sensor device based on said first resulting signal; and
         determine force information received as input to said resistive pointing stick based on said second resulting signal.

21. The electronic device of claim 20, wherein said sensor circuitry is further configured to:
   receive a third resulting signal comprising effects of said third varying voltage signal, said third resulting signal received while receiving said second resulting signal.

22. The electronic device of claim 20, wherein a transmitter of said sensor circuitry may be interchangeable utilized to drive said first varying voltage and said second varying voltage.

* * * * *